INVENTOR.
DONALD A. YOUNGBLOOD

June 13, 1972   D. A. YOUNGBLOOD   3,669,531
COMBINATION CARTRIDGE CONTAINING REMOVABLE TAPE
MAGAZINE AND REMOVABLE FILMSTRIP HOLDER
Original Filed March 17, 1966   4 Sheets-Sheet 3

FIG. 7

INVENTOR.
DONALD A. YOUNGBLOOD

United States Patent Office 3,669,531
Patented June 13, 1972

3,669,531
COMBINATION CARTRIDGE CONTAINING REMOVABLE TAPE MAGAZINE AND REMOVABLE FILMSTRIP HOLDER
Donald A. Youngblood, 111 Dolly Lane,
Chalfont, Pa. 18914
Original application June 14, 1968, Ser. No. 739,909, which is a continuation of application Ser. No. 535,149, Mar. 17, 1966. Divided and this application Apr. 6, 1970, Ser. No. 25,707
Int. Cl. G03b 31/00
U.S. Cl. 352—31       5 Claims

ABSTRACT OF THE DISCLOSURE

An audio-visual cartridge containing a removable filmholder having an endless filmstrip mounted thereon and a removable magazine containing an endless audio tape mounted therein. The cartridge has, adjacent the opening of its compartment which receives the filmholder, a window or framing aperture against which the filmstrip moves; adjacent the window are a pair of slots for receiving the film strip drive sprockets. The filmholder also contains an angularly-mounted mirror for directing the projection light beam through the portion of the filmstrip adjacent the window. The cartridge also has, adjacent the opening of its compartment which receives the magazine, openings for providing access to the audio tape for moving same from a protected to an operative position via aligned openings in the magazine.

---

This is a division of parent application Ser. No. 739,909 filed June 14, 1968 (now abandoned), which in turn is a continuation of grandparent application Ser. No. 535,-149, filed Mar. 17, 1966 (now abandoned). Three other such divisional applications of said parent application (Ser. Nos. 25,805, 31,071, and 31,072 and filed on even dates herewith) describe inventions closely related to the present invention.

This invention relates to an entertainment and/or educational device and more particularly to a combination visual and sound cartridge for such a device.

Combination audio and visual devices are known to be an important tool of education as well as sales. That is, where untrained teachers or salesmen are used, a device which combines a visual production with an audio background enables the untrained to present to a potential client or student a complete and well prepared program.

These combination visual and sound apparatus, however, have been inadequate because they are either inflexible or too difficult to operate for an untrained worker. At present, those which are easy to operate are so because they do not allow flexibility of programming. That is, in these devices, the apparatus is prepared in advance for presentation of a sound and film program in the factory and thus are able to show only a single presentation. In order to show an additional or alternate audio-visual presentation, it is necessary that the apparatus be transmitted to the factory which produced the apparatus originally and be returned with a different program. Or, the user would have to have a plurality of such devices, one for each program.

Those devices are flexible enough to present various programs are difficult to operate. The operator of such a device must be given an intensive orientation as to the capabilities of the machine and must be capable of trouble shooting if any disorder results. These devices normally require threading of the film through the various guide and sprocket wheels in the device. If it is necessary to use a different sound track with the pre-threaded film, the operator is required to manually synchronize the audio with visual presentation.

Therefore, there has been a recognized need for a combination visual and sound presentation device which is flexible enough so that various programs may be shown in the device yet is so uncomplicated to use that a relatively unskilled person may operate the device. For example where the device is to be used in various countries, the sound track should be easily interchangeable so that a plurality of sound tracks may be used with a single film. However, the device must be easy to operate.

It is, therefore, an object of this invention to provide a new and improved combination visual and sound apparatus.

Another object of the invention is to provide a combination visual and sound apparatus which readily handles a plurality of programs and which is adapted to easily interchange the audio and visual contents of a program.

Another object of the invention is to provide a new and improved unitized tape and film cartridge which is easily inserted into a visual and sound apparatus.

Another object of the invention is to provide a new and improved combination visual and sound apparatus having a receptacle which facilitates handling of film and tape cartridges.

Another object of the invention is to provide in a combination visual and sound apparatus a new and improved cartridge and cartridge receptacle therefor which is pivotable into and out of said apparatus to snap the cartridge into place.

These and other objects of the present invention are achieved by providing in a combination visual and sound apparatus, a cartridge having a first compartment for removably receiving a detachable magazine having mounted therein an endless coil of tape rotatably mounted for the production of sound, said cartridge having a separate second compartment for receiving an endless coil of film, said film adapted to be movable within said second compartment, said cartridge having an opening adjacent said film so that a single frame of said film may be positioned within said opening at a time, a pivotable cartridge receptacle mounted in said apparatus, a sound pickup means mounted in said receptable, said receptacle being adapted to removably receive said cartridge, said receptacle including means for moving a portion of said tape into an operative position adjacent said pickup means during insertion of said cartridge, said apparatus including a sprocket wheel and a capstan mounted adjacent said pivotable receptacle, said sprocket wheel adapted to engage said film when said receptacle is pivoted to a closed position, said capstan adapted to be adjacent said tape when said receptacle is closed and adapted to movably engage said tape when said apparatus is in operation.

Other objects and many of the attendant advantages of this invention will be readily appreciated as the same becomes better understood by reference to the following detailed description when considered in connection with the accompanying drawings wherein only those drawings necessary to explain the invention of the present divisional application have been retained.

DESCRIPTION

A combination visual and sound apparatus (not shown) embodying the invention has an outer body in the configuration of a small suitcase or attache case. When in use a screen assembly is extended outwardly from one wall thereof.

Figure 5:
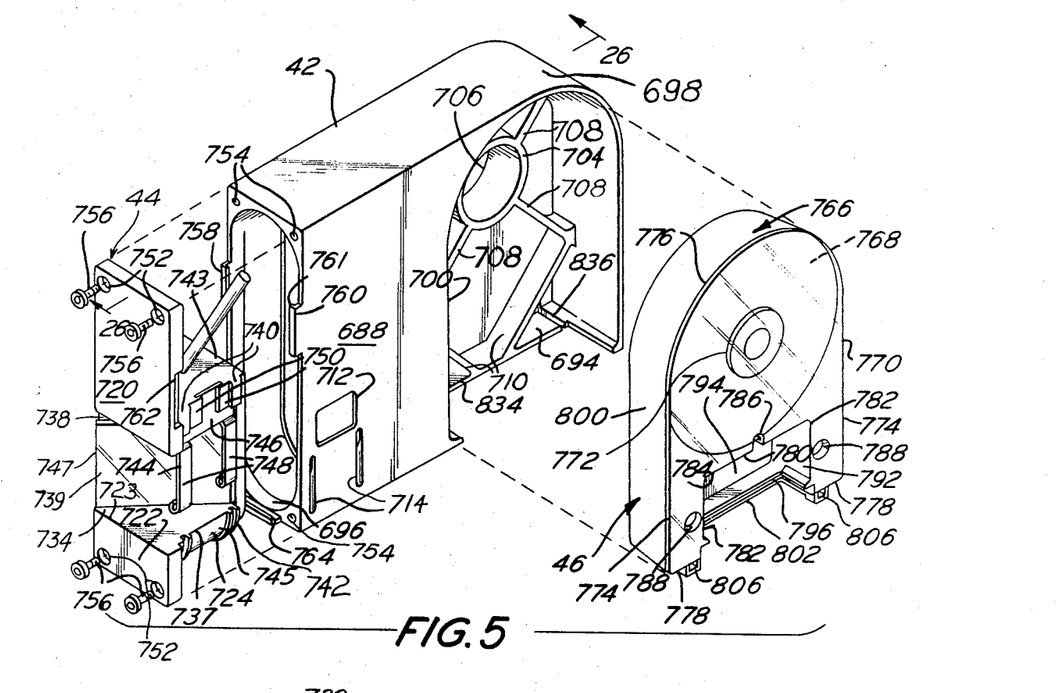
FIG. 5 is an enlarged perspective view of a unitized tape and film cartridge embodying the invention.

Another wall 38 (FIG. 1) of the device includes a cartridge receptacle 40 which is pivotably mounted in the wall. When pivoted outwardly, the receptacle 40 is adapted to receive a cartridge 42 which is shown in FIG. 5. Cartridge 42 is adapted to removably receive a film holder 44 and a tape magazine 46. The film holder 44 and tape magazine 46 are adapted to house an endless film strip and an endless tape, respectively.

Figures 8, 9, 10, 11:
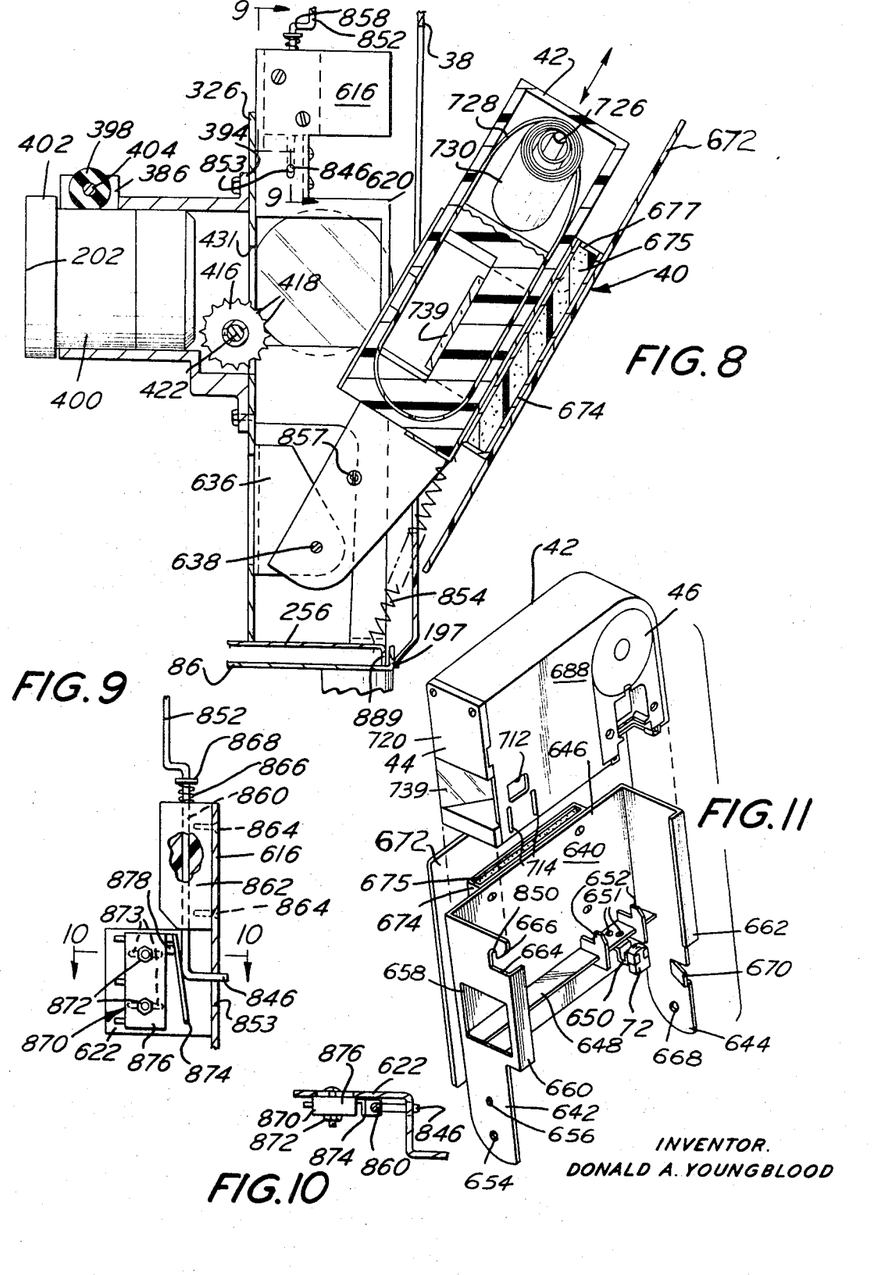
FIG. 8 is an enlarged sectional view similar to FIG. 1 with the cartridge receptacle in an open position.
FIG. 9 is an enlarged sectional view taken along the line 9—9 in FIG. 8.
FIG. 10 is an enlarged fragmentary sectional view taken along the line 10—10 in FIG. 9.
FIG. 11 is an exploded perspective view of the cartridge receptacle and the cartridge prior to insertion thereof.

In order to insert cartridge 42, the receptacle is pivoted out of the side wall 38 of the device and cartridge 42 is inserted in the receptable as best shown in FIG. 11. As will be seen hereinafter, the receptacle 40 includes means for exposing the tape magazine 46 during insertion of cartridge 42 in receptacle 40. After the cartridge 42 has been completely inserted into receptacle 40, the receptacle and cartridge are pivoted into side wall 38. The combination visual and sound apparatus is now in position to be operated.

For normal operation, the film is advanced by the detection of advance pulses from the sound tape.

An "Eject" switch (not shown) is mechanically linked to the pivotable receptacle 40 (FIG. 8) so that pressure applied to said switch ejects said receptacle. That is, the receptacle 40 is freed by the eject switch to pivot out of wall 38 when the switch is pressed.

Figure 6:
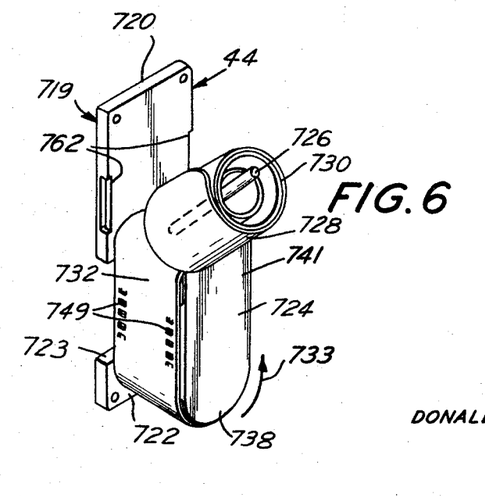
FIG. 6 is an enlarged perspective view of an endless coil of film wound about the film holder.
Figure 7:
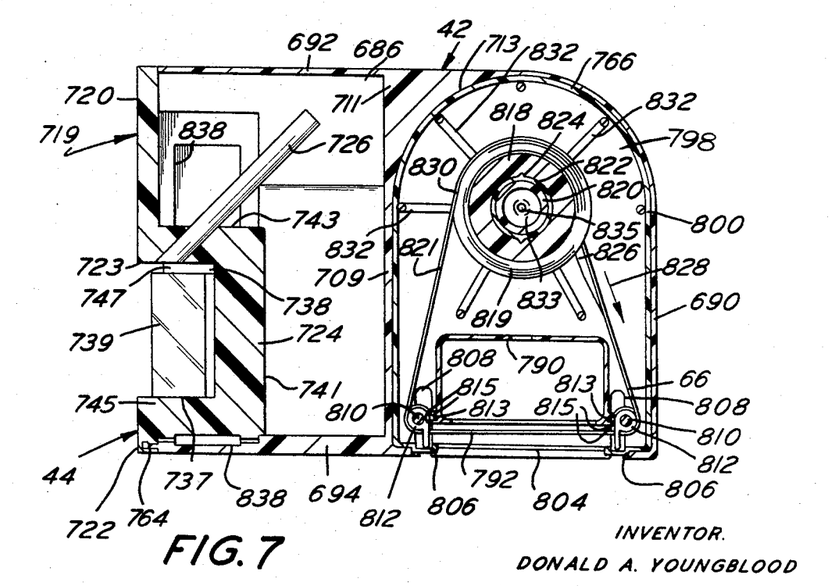
FIG. 7 is an enlarged sectional view taken along the line 26—26 in FIG. 5.

Referring to FIGS. 5, 6, and 7 the cartridge 42 is shown in greater detail. Cartridge 42 is generally rectangular, integrally formed and includes a rear wall 686, a forward wall 688, a side wall 690, a top wall 692 and a bottom wall 694. The remaining side of the cartridge 42 is comprised of an opening 696 which is formed between walls 686, 688, 690, and 692. Opening 696 is adapted to receive the film holder 44. The side wall 690 and top wall 692 are substantially planar and rectangular and integrally joined by an arcuate portion wall 698, thereby providing a rounded corner at one edge of the cartridge. The provision of a single rounded edge at the top of the cartridge 42 facilitates identification of the disposition of the cartridge for its insertion into receptacle 40.

The forward wall 688 is substantially rectangular, planar, and integral with walls 690, 692 and 694. Wall 688 includes an opening 700 which is adjacent to side wall 690. The opening 700 is similar in shape to the outline of the tape magazine 46 and provides a receptacle therefor. The depth in which the tape magazine 46 may be inserted is limited by webbing which is formed integrally and perpendicular to rear wall 686. The webbing comprises a hollow cylindrical member 704 which is aligned with a circular opening 706 in wall 686. The webbing also comprises four ribs 708 which are integral with, extend radially from and are spaced equally about the cylindrical member 704 towards walls 690, 698 and an inner compartment wall 709. Ribs 708 are each rectangular and are perpendicular to the plane of and integral with rear wall 686.

The webbing also comprises a pair of ribs 710 which are perpendicular to and integral with ribs 708 and extend therefrom towards lower wall 694. The ribs 710 are also rectangular and perpendicular to the wall 686 and are integral therewith. The ribs 710 and those ribs 708 which are integral therewith form a rectangularly shaped opening. The webbing, as previously mentioned, forms a bed for the tape magazine 46 so that it cannot penetrate too deeply into opening 700. Thus, the outer surface of magazines 46 is flush with and substantially in the same plane as wall 688 when the magazine is inserted in opening 700.

Forward wall 688 also includes a rectangular opening 712. Opening 712 is substantially the size of but slightly larger than a single frame of 35 mm. film. A pair of vertically elongated slots 714 are also provided in wall 688 below opening 712 which are parallel to each other, spaced from each other, and disposed on opposite sides of opening 712. The slots 714 are so positioned that the discs 416 of a sprocket wheel 78 (FIG. 1) may extend therethrough when the cartridge 42 is inserted in the cartridge receptacle 40 and the cartridge receptacle pivoted into wall 38. The opening 696 in the side of cartridge 42 is elongated with the sides 716 of said openings being substantially flat, parallel, and spaced from each other and with ends 718 of the opening 696 being semi-circular.

The cartridge 42 is separated into two compartments by a compartmental wall 709 which extends perpendicularly to and between walls 692 and 694 of the cartridge and is also integral therewith. The compartmental wall 709 is substantially rectangular and planar along its major portion and includes a flared portion 711 at the portion thereof which is integral with wall 692. Flared portion 711 includes an arcuate edge 713 which enables the opening 700 in wall 688 to be similar in shape to the rounded top portion of magazine 46. Wall 709 is vertically disposed, integral with and bridges the walls 686 and 688 of the cartridge 42. It extends transversely between these walls and forms an internal wall for the compartments which receive the magazine 46 and film holder 44. The wall 709 also acts to rigidify the structure of cartridge 42.

The film holder 44 is best seen in FIG. 6. The film holder 44 is integrally formed and comprises an outer wall 719 which includes a portion 720 which is planar and rectangular, a second rectangular portion 722 which is spaced from wall 720 by a rectangular opening 723, a film guiding means 724 and a stem 726. The film holder 44 is adapted to hold a roll of film 728. Film 728 is preferably 35 mm.; however any conventional size of film may be used without departing from the scope of the invention. Roll of film 728 is wrapped so that it is formed as an endless loop of film. The roll includes a coiled portion 730 which is telescoped over stem 726 and a loop portion 732 which is threaded around the film guiding means 724. The loop 732 emanates from the center of coil 730 and is wound back on the outer loop of coil 730. The film is therefore moved around the guiding means 724 in the direction of arrow 733. Thus, as the film 728 is moved around the guiding means 724, the loop is drawn from the center of coil 730 as the film being wound up on the coil 730 is returned to the outside thereof.

The film guiding means 724 is a somewhat rectangularly shaped solid member having a wedge shaped channel 734 (FIG. 5) provided at the center thereof. The channel 734 has parallelly spaced and triangularly shaped bottom and top surfaces 723 and separates between portions 720 and 722 of wall 719. The channel also forms an integral opening 737 adjacent film guiding means 724. The remaining wall of channel 734 is a rectangular planar surface 738 which is vertically disposed and extends at approximately a 45° angle from the plane of wall 719. This wall includes a mirror 739 which is bonded flat against the surface thereof.

Figures 1, 2, 3, 4:
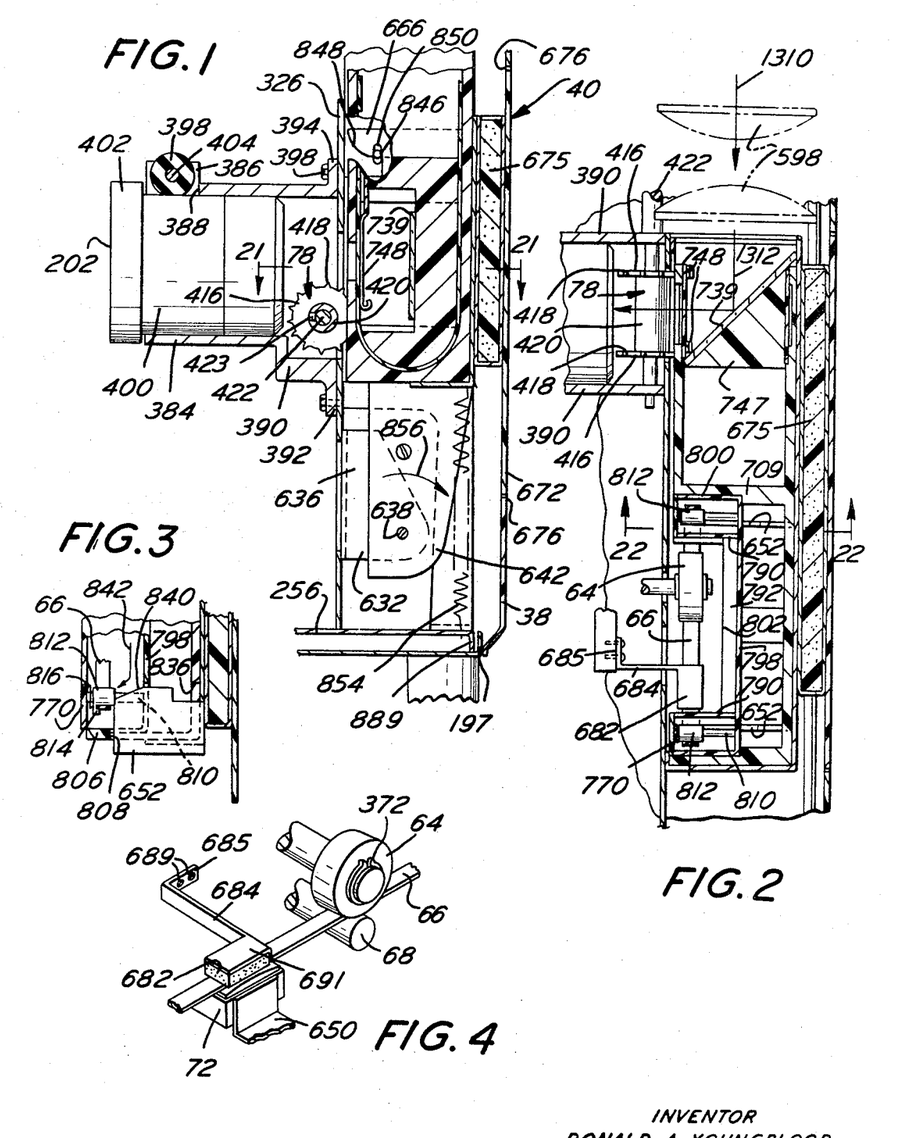
FIG. 1 is an enlarged sectional view of a cartridge according to the invention in operating position in its projector.
FIG. 2 is an enlarged sectional view taken along the line 21—21 in FIG. 1.
FIG. 3 is an enlarged sectional view taken along the line 22—22 in FIG. 2.
FIG. 4 is an enlarged perspective view of the tape feed read-out assembly in said cartridge.

Guilding means 724 extends laterally from wall 719 and is integral with portions 720 and 722 thereof. The guiding means includes an inner wall 741 which is planar and generally rectangular and lies in a plane substantially parallel to the plane of wall 719. The wall 741 is integral with and adjacent a top wall 743 which is rectangular and horizontally disposed and is perpendicular to wall 741. The guiding means 724 further includes an arcuately shaped bottom wall 745. Bottom wall 745 has an arcuate lower surface and is integral with and extends perpendicularly from wall 741 towards portion 722 of wall 719. The bottom wall 745 and top wall 743 are bridged by a vertically extending wall 747. Wall 747 includes rectangular surface 738 which is disposed at substantially a 45° angle from the outer surface of wall 747. As best seen in FIG. 2, wall 747 is substantially triangular in cross-section. As best seen in FIG. 5, the remaining side of the guiding means 724 is formed as an opening 737 and is somewhat bridged by a spring clip as will hereinafter be seen. The loop 732 (FIG. 6) of the film 728 is guided around the outer surface of walls 743, 745, and 747 and past opening 737. The opening 737 provides in combination with opening 734 a window for reflection of light from a lamp through a frame of film 728 to the display screen.

The outer surface of the film guiding means 724 also includes a pair of projections 740 which extend laterally from top wall 743 and act to press the loop 732 of the film 728 against the side surface of the opening 696. A pair of U-shaped projections 742 also extend laterally from the outer surface of bottom wall 745 of the film guiding means 724 and are vertically aligned with projections 740 on the opposite side of opening 737. Each of the U-shaped projections 742 includes a pair of parallel legs which are integral with and perpendicular to the outer surface of wall 745 and are separated by a groove. The legs of the U-shaped projections 742 are projected outwardly substantially similar to projections 740 also to press the film against the side wall of opening 696. The grooves between the legs enable the teeth 418 on discs 416 of the sprocket wheel 78 (FIG. 1) to grasp the film and advance the frames thereof.

As best seen in FIG. 6, the roll of film 728 includes a plurality of sprocket holes 749 which extend along the sides of the film. Sprocket holes 749 are provided on both sides of each of the frames and are engageable by the sprocket teeth 418 of discs 416 of sprocket wheel 78. The film is guided over the lateral surface of guiding means 724 so that the holes are aligned with the grooves between the legs of projection 742. Thus, the sprocket teeth 418 extend through sprocket holes 749 into grooves and draw the loop 732 about the guiding means 724 in the direction of arrow 733.

A U-shaped spring clip 744 depends from the film guiding means 724 into the channel 734 and is provided to urge the film in loop 732 against the framing aperture or window 712 when film holder 44 is inserted in opening 696 of the cartridge 42. The U-shaped clip 744 includes a rectangular planar web 746 and a pair of perpendicularly extending planar legs 748. The web 746 is secured to the film guiding means 724 by a pair of integral tabs 750 which overlap web 746 and thereby secure the clip 744 in place. The normal tendency of the legs 748 is to extend out of the outer surface of film guiding means 724 at an acute angle and thus urge the film against window 712 as the film passes thereby. The film holder 44 further includes a plurality of holes 752 at the outermost corners of wall portions 720 and 722. The main portion of cartridge 42 further includes a plurality of openings 754 which are adjacent to and extend in the direction of opening 696. The openings 754 are disposed so that they are aligned with openings 752 when the film holder 44 is inserted in opening 696. The film holder is preferably secured therein by threaded fasteners 756 which extend through openings 752 and are threadedly secured in openings 754. It should be understood that fasteners 756 are optional in that they are not required for ordinary operation of apparatus 30. As will be seen hereinafter, the film holder 44 is normally maintained in place within opening 696 by a snap fastening action. The fasteners 756 are provided where it is not desirable that film 728 be readily changeable and/or accessible to the operator of the device.

Wall 686 includes a rectangular tab 758 which extends from the wall in the direction of the film holder 44. Wall 686 also includes a rectangular tab 760 which is similar to and aligned vertically with tab 758. Tabs 758 and 760 each include a vertically extending bead 761; these beads are provided on the inner surfaces of the tabs and extend toward each other. Tabs 758 and 760 are aligned with and fit into recesses 762 which are provided in the vertical edges of wall 720 to position the film holder 44 when inserted in opening 696 of cartridge 42. When tabs 758 and 760 are inserted into the recesses 762, beads 761 snap into detents (not shown) in these recesses to provide a solid securement of the film holder in the opening 696. The location of tabs 758 and 760 are eccentric with respect to the axis of the cartridge 42 so that the film holder 44 is always inserted in the same direction within opening 696. Bottom wall 694 (FIG. 7) also includes a horizontally extending tab 764 which engages wall 722 in a recess similar to recess 762. The film holder 44 is thus secured in the cartridge 42 by the snap action of tabs 758, 760, and 764.

Tape magazine 46 is best seen in FIGS. 5 and 7 and is preferably of the type shown in United States Pat. No. 2,911,215.

As best seen in FIGS. 5 and 7, the tape magazine 46 basically comprises a cover 766, a circular disc 768 and an endless sound recording tape 66. Cover 766 comprises a base plate 770 and a cup shaped portion 772. The plate 770 is substantially planar and the periphery thereof includes a pair of parallel straight edges 774 which are bridged by a semi-circular top edge 776 at one end and are bridged at their bottom end by a pair of straight edges 778 which are perpendicular to and extend inwardly from edges 774 and are separated by a substantially U-shaped edge 780. The U-shaped edge 780 extends inwardly from edge 778 towards the semi-circular edge 776 to provide a rectangular opening for access to the tape 66. The U-shaped edge 780 includes a pair of parallel straight edges 782 which are perpendicular to straight edges 778 and which are bridged by a perpendicular straight edge 784. A U-shaped notch 786 is provided which extends from the central portion of edge 784 towards semicircular edge 776. The plate 770 also includes a pair of countersunk openings 788 which are located between edges 774 and 782 and which are adapted to receive locating posts and as the cartridge 42 is inserted into the projector.

The base plate 770 further includes an integral flange 790 of U-shaped cross-section which is perpendicular to and depends from U-shaped edge 780 of the base plate 770 towards the cup shaped portion 772 of the cover 766. The inner edge of the flange 790 is substantially defined as the outline formed by the U-shaped edge 780. The open end of the U-shaped flange 790 is bridged by an elongated rectangular strip 792. The innermost edge 794 of strip 792 closest to the cup shaped portion 772 of cover 766 is continuous with the edge of flange 790 closest to the cup shaped portion. The outermost edge 796 of strip 792 is spaced from the innermost edge 794 only a small portion towards the plane of plate 770. Thus, it can be seen best in FIG. 5 that the width of strip 792 is smaller than the depth of cup shaped portion 772 or U-shaped flange 790 and thereby defines a lateral opening in the lowermost edge of the tape magazine 46, the purpose of which will appear hereinafter. The flange 790 forms a recess in base plate 770 which provides accessibility to the tape 66 by rubber roller 64 as well as pressure pad 682 FIG. 2.

The cup shaped portion 772 of the cover 766 comprises a cover plate 798 and a peripheral skirt 800. Peripheral skirt 800 is integral with cover plate 798 and extends from the periphery thereof with a slight flare. The plate 798 is substantially similarly outlined to base plate 770 but does not include a cut out portion such as U-shaped edge 780 and therefore has a straight lower edge. The peripheral skirt 800 extends adjacent to and bears against the straight edges 774 and semi-circular edge 776 of the base plate 770. The lowermost portion of the peripheral skirt 800 includes a rectangular opening 802. The portion of peripheral skirt 800 below opening 802 and 804 is substantially similar to strip 792 and is substantially aligned therewith. The strip 792 and portion 804 define a channel through which tape 66 passes. As will be seen hereinafter, the strip 792 and portion 804 of skirt 800 act to encapsulate and therefore protect tape 66 when the tape magazine 46 is not inserted into the projector.

Skirt 800 also has in its lowermost portion a pair of outstruck projections 806. As best seen in FIG. 3, a pair of elongated slots 803 are provided in projection 806 which extend perpendicularly to cover plate 798. Slots 808 continue into the cover plate 798 and extend parallel to the straight lateral sides thereof as best seen in FIG. 7. The base plate 770 also has a pair of cylindrical posts 810 which are integral therewith and extend perpendicularly therefrom. As best seen in FIG. 3, posts 810 extend towards and abut the cover plate 798. Posts 810 support a pair of nylon guides 812. Guides 812 are substantially cylindrical, have a cylindrical bore, and are slidable longitudinally on posts 810. The nylon guides 812 each include a projection 814 which extends into projection 806 and which is L-shaped and acts to support tape 66. Also telescoped over posts 810 are helical springs 816. Springs 816 are inserted over posts 810 between the plate 770 and the nylon guides 812. Springs 816 urge the nylon guides to the endmost point of post 810 so that when the tape magazine 46 is not inserted in the apparatus, the nylon guides bear against the plate 798. The tape 66 is thus urged adjacent cover plate 798 and is maintained there by the projections 814 of the nylon guides. In this position, the tape is completely encapsulated by strip 792 and portion 804 of the skirt 800.

As best seen in FIG. 7, nylon guides 812 also include laterally projecting ridges 813. Ridges 813 extend axially along the guides 812, are integral therewith and extend inwardly towards each other. The U-shaped flange 790 includes at the ends of each of its legs adjacent strip 792, a pair of legs 815. Each pair of legs 815 is horizontally disposed, integral with flange 790 and parallelly spaced from each other. They are separated by a groove in which the ridges 813 are engaged. The legs 815 are coextensive with the length of the flange 790. The grooves provided between the legs 815 act as a track for the ridges 813. Ridges 813 are longitudinally slidable in said grooves and act to maintain the disposition of nylon guides 812. That is, the ridges 813 prevent rotation of nylon guides 812 about posts 810 as the tape passes therearound in the direction of arrow 828.

As also best seen in FIG. 7, the tape is wound as an endless loop about a drum 818. The tape 66 comprises a coil portion 819 which is wound around drum 818 and a loop portion 821 which emanates from the center of coil 819, is threaded around nylon guides 812 and is wound back on the outside loop of coil 819. Drum 818 is integral with and is perpendicular to disc 768 which is shown in phantom in FIG. 5. The disc 768 is circularly shaped and planar. It acts to support the coil of tape 66 and rotates therewith. Drum 818 is rotatably mounted about an annular flange 820 which projects from, is integral with, and extends perpendicularly from the base plate 770. The drum 818 is separated from the flange 820 by a nylon collar 822. Collar 822 is substantially cylindrical and includes a pair of longitudinally or axially extending ridges 824 which are on diametrically opposite sides of the outer surface thereof and which engage drum 818 in axially extending slots which are provided therein and are of similar cross section. Thus the drum 818 and collar 822 rotate together about annular flange 820.

When pressure roller 64 and capstan 68 (FIG. 4) engage the tape 66, the tape is drawn out of the center of the coil at 826 (FIG. 7) and is drawn in the direction of arrow 828. The tape 66 is wound back about the coil at point 830. Thus the tape travels out of the center of the coil of film about drum 818 to the first nylon guide 812. Then it passes through strip 792 and portion 804 of the skirt 800. It is then passed about the remaining guide 812 and back to the outermost loop of the coil 819 about drum 818. By threading the tape in this manner, the tape 66 may be played continuously without rewinding. The cup shaped portion 772 of cover 766 includes an annular web (not shown) which is integral with cover plate 798 and is perpendicular thereto. The annular web also includes a plurality of radially extending webs 832 which are rectangular strips and extend to and are connected to the inner surface of skirt 800. Webs 832 act to space the coil 819 of sound tape 66 from the plate 798 and retain the coil 819 on the circular disc 768. Thus webs 832 maintain coil 819 of tape 66 in a nearly wound condition at all times.

The flange 820 is integral with a circular end piece 833 which includes a circular opening at the center thereof. The cover plate 798 of the cup shaped portion 772 of cover 766 includes an opening which is aligned with the opening in end piece 833. The cup shaped portion 772 is secured to the base plate 770 by a fastener 835 which extends through the opening and secures the plates together. The portions of cover 766 are thus secured together for encapsulation of the tape 66. The tape 66 is thus not accessible until nylon guides 812 are moved by release brackets 652 (as will hereinafter be seen) to expose a portion of the loop 821 of tape 66.

The cover 766 including cup shaped portion 772 is preferably comprised of a transparent material such as plastic. Thus, if tape 66 should become inadvertently unthreaded, the condition is easily seen through the cover of the magazine.

As best seen in FIG. 5, the tape magazine 46 is inserted in cartridge 42 by inserting the cartridge in opening 700. As hereinbefore mentioned, the cover plate 798, though similar in shape to base plate 770, is slightly smaller than the plate 770. Thus skirt 800 extends outwardly towards the outer edge of the base plate 770. That is, the base plate is fitted within and is adjacent to the outermost edge or lip of skirt 800. The cover 766 of the magazine thus tapers to a smaller size from the base plate 770 towards cover plate 798. As a result of this tapering, the magazine is not placeable within opening 700 easily if it is disposed backward when inserted therein. That is, the base plate 770 is substantially the same width and length as the opening 700 and therefore does not slip easily into the opening 700. However, the cover plate 798 is smaller than the opening 700 and therefore slides easily into the opening. The flaring of the skirt 800 towards plate 770 also enables the tape magazine to be easily placeable into cartridge 42 and secured more tightly as it is inserted deeper into the opening 700.

As seen in FIG. 5, opening 700 in rear wall 686 is adjacent to and communicates with a rectangular opening 834 which is provided in bottom wall 694. Opening 834 is substantially the same size as opening 802 in the skirt 800 of the tape magazine 46. Thus, opening 834 in the cartridge 42 provides access to the tape magazine 46 through bottom wall 694. Also provided in bottom wall 694 are a pair of elongated slots 836. Slots 836 extend perpendicularly from opening 834 and extend perpendicularly into rear wall 686. Slots 836 are aligned with slots 808 of the tape magazine 46 when the magazine is placed in opening 700 so that access is provided through slots 836 in the cartridge 42 to nylon guides 812 in magazine 46. The film holder 44 is inserted in opening 696 with guiding means 724 being inserted first and the portions 720 and 722 of wall 719 being engaged by tabs 758, 760, and 764. The roll of film 728 is thereby positioned within the cartridge for display thereof.

As best seen in FIG. 7, the cartridge includes an elongated groove 838 in which the film is guided. It can be seen that the cartridge 42 provides physical access to the sprocket wheel 78 for advancing or moving the film 728 and the audio tape 66 in the plane of forward wall 688. The access provided in wall 688 to film 728 is via slots 714 which are adapted to receive discs 416 of sprocket wheel 78. Access to tape 66 is provided by the recessed opening defined by edge 780 of the base plate 770 of the tape magazine 46 which is adapted to enable pressure roller 64 and pressure pad 682 to enter therein. It can also be seen that access is provided for the movement of tape 66 by opening 834 in lower wall 694 which enables capstan 68 and sound pickup head 72 to contact tape 66 therethrough. Slots 836 and 808 within the magazine 46 enable release brackets 652 to engage guides 812. The cartridge 42 also includes openings 723 and 737 which enable a collimated beam of light from a lamp to be passed through a frame of film 728 and directed toward screen 61. Thus light may be projected perpendicular to the plane of portions 720 and 722 of wall 719 through opening 723 into cartridge 42. It is then reflected off mirror 739 perpendicularly through a frame of the film 728 and out through opening 737.

As best seen in FIGS. 8 and 10, cartridge 42 is adapted to be inserted into cartridge receptacle 40 between plates 642 and 644. As the cartridge is slid into place, the release brackets 652 project into slots 836 of the cartridge 42 and the slots 808 of tape magazine 46. As best seen in FIG. 3, the inclined edges 840 of bracket 652 slide the tape guides 812 in the direction of arrow 842. As the tape guides 812 are moved in the direction of arrow 842, the audio tape 66 is drawn out of the channel formed by strip 792 and portion 804 of the skirt 800. As best seen in FIG. 2, the tape 66 is thus made accessible to the roller 64, capstan 68, pressure pad 682, and sound pickup head 72 through opening 802. At best seen in FIGS. 1, 2 and 8, when the cartridge receptacle 40 is pivoted and inserted into apparatus 30, the entire assembly is pivoted about fasteners 638 in the direction of arrow 844 of FIG. 8. The cartridge receptacle is secured in place by a locking post 846 which is moved downwardly by the tapered forward edge 848 of the locking finger 666 until the post 846 reaches notch 850 of the finger and moves upwardly therein. The cartridge receptacle 40 is thus maintained in place until the locking post 846 is moved downwardly out of notch 850.

Locking post 846 is the endmost projection of an elongated bar 852 which is connected to the eject switch 58. As best seen in FIG. 8, locking post 846 extends through a vertically elongated slot 853 which is provided in flange 616. As the eject switch 58 is pushed downwardly, the bar 852 is moved downwardly and the locking post 846 is likewise moved downwardly, thereby enabling the locking finger 666 to be clear of said post. The cartridge receptacle 40 is opened as a result of being connected to a spring 854 which is in turn connected to inner lower wall 256. The spring 854 urges the cartridge receptacle downwardly, thereby urging the cartridge receptacle to pivot about fasteners 638. Thus when the locking post 846 is moved out of the notch 850, finger 666 becomes free and thereby enables the cartridge receptacle to be drawn to an open position in the direction of arrow 856.

As best seen in FIG. 9, plate 642 of the cartridge receptacle 40 has a stop 857. The stop 857 is secured to plate 642 in opening 656 thereof. Stop 857 extends perpendicularly to the surface of plate 642 and is adapted to abut edge 626 of opening 624 in flange 616. Thus the stop 857 prevents the cartridge receptacle 40 from being drawn by spring 854 too far out of the apparatus 30. The stop engages edge 626 only when the cartridge receptacle 40 is pivoted out of the opening 676 in wall 38.

The cartridge 42 is slid into and out of cartridge receptacle 40 in the direction of arrows 859 (FIG. 8) when the receptacle is disposed in its outermost position. The cartridge 42 is not movable in the receptacle 40 when the receptacle is pivoted into the apparatus. Thus the film 728 and tape 66 are not subjected to undue stress as a result of improper positioning of the cartridge 42 within the cartridge receptacle.

An eject switch (not shown) is attached to the top of bar 852 (FIG. 9). Bar 852 extends downwardly from eject switch and to an integral horizontal bridging section 858. Bridging section 858 is connected at its other end to a downwardly extending integral vertical portion 860. A substantially rectangular member 862 having a vertically extending cylindrical bore therethrough is connected to flange 616 by fasteners 864. Member 862 acts as a vertical guide means for the bar 852 so that it will be restrained against horizontal or transverse movement when moved vertically by eject switch 58. The bar 852 is biased upwardly by a spring 866 which is telescoped over the vertical portion 860 of the bar 852. A collar 868 is mounted about the vertical link adjacent the top thereof and provides a shoulder to bear against the upper edge of spring 866. The lower edge of spring 866 bears against the top surface of member 862. Thus the eject switch is biased upwardly and maintains its uppermost position unless pressed manually in a downward direction.

A microswitch 870 (FIG. 10) is connected to tab 622 of flange 616 by fasteners 872. The fasteners extend through slotted openings 873 in the tab 622 and are threadedly secured in microswitch 870. The slotted openings 873 extend horiztonally and enable the placement of microswitch 870 to be adjusted in order to ensure operation of the switch each time the eject switch is pressed. When eject bar 852 is pressed downwardly, the corner between locking post 846 and link 860 urges arm 874 of the microswitch towards the body 876 of the microswitch 870. As arm 874 is urged towards the body 876, a link 878 is moved inwardly of body 876 and thereby opens microswitch 870. The microswitch 870 is normally closed and is in the same circuit, as will be seen hereinafter, with solenoid 62. Thus, as eject bar 852 is moved downwardly to eject the cartridge receptacle 40, the microswitch 870 is opened, thereby opening the circuit to solenoid 62, which in turn releases the roller 64 from against capstan 68. In this manner, when the eject button is pushed, the sound tape 66 is released from between pressure roller 64 and capstan 68 so that the tape cannot be inadvertently pulled out of the tape magazine by ejecting cartridge 42 during the operation of the projector.

OPERATION

When the projector is not in operation, cartridge receptacle 40 is pivoted into wall 38, as shown in FIG. 1 and is locked therein by locking post 846 of the eject switch.

To open receptacle 40, the eject switch is pressed downwardly which urges locking post 846 downwardly to release locking finger 666 of the cartridge receptacle 40. The cartridge receptacle 40 is then pivoted outwardly as the spring 854 draws the cartridge receptacle about fasteners 638 in the direction of arrow 856 in FIG. 1. The cartridge receptacle is thereby positioned, as shown in FIG. 8, for removing or receiving a cartridge 42. Cartridge 42 is slid into or out of the cartridge receptacle 40 in the direction of arrows 859. As best seen in FIG. 3, as a cartridge is inserted into the receptacle, release brackets 652 urge nylon guides 812 of the tape magazine 46 against base plate 770 thereof and thereby draw tape 66 out of the confines of the magazine 46.

The tape 66 is thus readily accessible to capstan 68 and roller 64 for movement and is drawn against sound pickup head 72 as the cartridge 42 bears against the bottom of receptacle 40. The cartridge is then pivoted manually in the direction of arrow 844 in FIG. 8 so that the outer wall 672 of the receptacle is flush with outer wall 38. The tape is simultaneously inserted between the capstan 68 and pressure roller 64 as well as underneath pressure pad 682.

Energization of the projector causes pressure roller 64 and pressure pad 682 (FIG. 4) to press downwardly against capstan 68 and the sound pickup head 72, respectively. The rotation of capstan 68 moves sound tape 66. The tape 66 is drawn between capstan 68 and pressure roller 64.

The sound pickup head 72 reproduces the audio portion recorded on tape 66 while a frame of film 728 is projected on the projector's screen. The program on the sound track of tape 66 is sensed by sound pickup head 72 and transmitted to an audio amplifier which supplies a speaker. Simultaneously, sound pickup head 72 also senses signals on the control track of tape 66 and feeds them to tone amplifier.

The output of the tone amplifier energizes a suitable mechanism which is connected to sprocket wheel 78, which in turn is engaged with film strip 728 through slots 714 and thereby advances the film a single frame as a result of each tone burst.

The apparatus is provided with safety features to prevent the tearing of sound tape 66. That is, there are two ways in which the tape 66 could possibly be injured The first is to close the cartridge receptacle 40 with cartridge 42 in place while apparatus 30 was in operation. In that event, the roller 64 would be pressed against capstan 63, thereby preventing the tape from being slid therebetween. Thus the tape 66 could be broken if the cartridge 42 is inserted into the apparatus while the machine is in operation. To prevent such a happening, a microswitch is provided which is closed only when the cartridge receptacle 40 is inserted into the wall 38. The microswitch must be closed in order to cause roller 64 to be drawn against capstan 68. Thus roller 64 cannot be drawn against capstan 68 without the cartridge receptacle 40 having been completely closed.

The other way that the tape 66 could conceivably be damaged is if during the operation of the apparatus 30, the eject switch is inadvertently pressed, the cartridge receptacle 40 would be drawn open by spring 854 and the tape 66 would be caught between pressure roller 64 and capstan 68, thus, pulling the tape out of the magazine 46. To prevent against such a happening, another microswitch is provided which is opened whenever eject switch is pressed downwardly. This releases the pressure roller 64 from capstan 68 prior to the opening of the cartridge receptacle 40. When the pressure roller 64 is released from capstan 68, tape 66 is freed to travel with the magazine 46.

It can be seen that the instant device is extremely flexible without decreasing the ease with which it may be operated. The combination visual and sound cartridge does not require threading or other time consuming as well as difficult manipulations to initiate its operation. It is necessary only to slide a cartridge 42 into the cartridge receptacle 40, pivot the cartridge receptacle into the apparatus, and the device is ready for operation.

The flexibility of performance is enhanced by the readily interchangeable cartridge 42. The film is readily interchangeable in the film holder 44 for insertion into the cartridge 42. Similarly, tape magazines may be easily replaced by other magazines in opening 700 of the cartridge. Thus, the complete audio and visual program is contained in a single cartridge and is readily interchangeable with other complete programs contained in other cartridges 42 by replacement thereof in the cartridge receptacle 40.

The design of cartridge 42 also enhances to use of the audio-visual device in various foreign countries. That is, where the film content of a program need not be changed, it is necessary only to provide a magazine having a foreign language sound track. In this manner, the apparatus may be taken from one country to another without requiring a separate device for each country. Only a single cartridge 42 for each program is necessary in that the tape magazines 46 for each country may be used with the same cartridge.

The construction of the cartridge 42 also enables the tape and film to be easily accessible for movement and sensing of the tape and movement of and projection through the film. This accessibility is maintained while the tape and the film are completely self-contained within the confines of cartridge 42. Thus, the cartridge need not be handled with extreme care.

It should also be noted that the receptacle 40 of the apparatus enhances the ease with which the device may be operated in that the cartridge is pivotable into and out of a side wall of the device. The cartridge receptacle provides easy access to the cartridge when it is out of the apparatus, yet when it is closed, the cartridge receptacle completely encapsulates the cartridge 42 within the device to prevent inadvertent movement or jarring thereof.

The release brackets and sound pickup head provided in the receptacle enable the sound tape 66 to be made accessible for operation during insertion of the cartridge into the receptacle. The tape is placed against the sound pickup head during the insertion so that further movement of the tape with respect to the sound pickup head is unnecessary prior to placing the cartridge within the apparatus. Thus the cartridge 42 is prepared for operation by the receptacle 40 prior to insertion into the apparatus 30. Further, lever operated or other constructions for operatively positioning the film or tape are obviated in that the film and the tape are positioned adjacent the capstan and sprocket wheel, respectively, when pivoted into the apparatus.

Obviously many modifications and variations of the present invention are possible in the light of the above teachings. It is, therefore, to be understood that within the scope of the appended claims and their legal equivalents, the invention may be practiced otherwise than as specifically described.

What is claimed as the invention is:

1. A cartridge for a combination visual and sound apparatus comprising a generally rectangular housing having a first compartment comprised of an opening in a first wall of said housing, said compartment adapted to removably receive a magazine for an endless loop of tape which is rotatably housed therein, said cartridge having an opening in a second wall thereof, said opening forming a second compartment for removably receiving a film holder for an endless loop of film, said first wall further including a window adjacent said second compartment, said window adapted to have a single frame of said film positioned therein when said film holder is inserted in said second compartment, said first wall of said cartridge further including a pair of slots adjacent to and on opposite sides of said window, said slots adapted to provide access to said film for movement thereof, said tape magazine including an outer wall which is disposed substantially in the plane of said first wall of said cartridge, said outer wall including an opening for providing access to said tape, an elongated opening in a third wall of said cartridge, said opening being disposed adjacent to said opening in the outer wall of said tape magazine, said openings in said outer wall of said magazine and said third wall of said cartridge providing access for movement of said tape, said third wall further including slots which extend transversely to said opening in said third wall for providing access to said tape for movement thereof from a protected to an operative position, whereby said cartridge provides access to said tape and said film while encapsulating the same prior to use thereof.

2. The invention of claim 1 wherein said film holder comprises a stem, means for guiding said film and an integral planar outer wall having an opening therein, said outer wall being substantially planar and disposed in a plane parallel and adjacent to the plane of said second wall of said cartridge, said endless film comprising a coil portion and a loop portion, said guiding means adapted to receive said loop, said stem adapted to be inserted through the center of said coil, said guiding means being integral with said outer wall and including an inclined channel which extends from the opening in said outer wall to the outer surface of said guide means to form an opening in the surface thereof, said opening being aligned with said window in said cartridge, a light reflecting member secured to the base of said channel whereby light is projected into said film holder through said opening in said outer wall to said reflection member and is reflected through the frame within said window for display of the image in said frame.

3. The invention of claim 2 wherein said guiding means includes a bifurcated spring clip, said clip being disposed within said loop of said film for urging said loop adjacent said window.

4. The invention of claim 2 wherein said stem is secured to said guiding means, said stem extending through said coil of film so that said coil of film is loosely fitted thereover and said loop of film emanates from the center of said coil, said loop being wound upon said coil on the outer loop of said coil whereby said film is moved endlessly around the guiding means.

5. The invention of claim 2 wherein said cartridge includes a plurality of tabs, said tabs extending from the walls of said second compartment, said wall of said film holder including a plurality of recesses corresponding in depth to the cross-section of said tabs, said recesses being so disposed that upon insertion of said film holder into said cartridge, said tabs snap into said recesses.

References Cited
UNITED STATES PATENTS

| | | | |
|---|---|---|---|
| 3,211,054 | 10/1965 | Schwartz | 353—15 |
| 3,252,372 | 5/1966 | Gallina | 353—15 |
| 3,414,351 | 12/1968 | Platt | 353—15 |
| 3,466,123 | 9/1969 | Skuja | 352—72 |
| 3,498,703 | 3/1970 | Gerry | 252—31 |
| 3,547,529 | 12/1970 | Anthes | 252—31 |

S. CLEMENT SWISHER, Primary Examiner

U.S. Cl. X.R.

352—78 R; 353—15

UNITED STATES PATENT OFFICE
CERTIFICATE OF CORRECTION

Patent No. 3,669,531　　　　　　　Dated June 13, 1972

Inventor(s) Donald A. Youngblood

It is certified that error appears in the above-identified patent and that said Letters Patent are hereby corrected as shown below:

In the heading to the printed specification, after line 6 should read -- Assignor by mesne assignment to Optisonics Corporation, Montgomeryville, Pa., a corporation of Pennsylvania --.

Signed and sealed this 12th day of December 1972.

(SEAL)
Attest:

EDWARD M. FLETCHER, JR.　　　　　ROBERT GOTTSCHALK
Attesting Officer　　　　　　　　Commissioner of Patents